US012583379B2

(12) United States Patent
Masuda

(10) Patent No.: US 12,583,379 B2
(45) Date of Patent: Mar. 24, 2026

(54) VEHICLE PERIPHERY MONITORING SYSTEM

(71) Applicant: TOYOTA JIDOSHA KABUSHIKI KAISHA, Toyota (JP)

(72) Inventor: Takato Masuda, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 74 days.

(21) Appl. No.: 18/813,395

(22) Filed: Aug. 23, 2024

(65) Prior Publication Data

US 2025/0100442 A1 Mar. 27, 2025

(30) Foreign Application Priority Data

Sep. 25, 2023 (JP) ................................. 2023-160046

(51) Int. Cl.
| | |
|---|---|
| *H05B 47/105* | (2020.01) |
| *B60Q 1/24* | (2006.01) |
| *B60R 1/24* | (2022.01) |
| *G06V 20/56* | (2022.01) |
| *H04N 7/18* | (2006.01) |
| *H05B 45/10* | (2020.01) |
| *H05B 45/20* | (2020.01) |

(52) U.S. Cl.
CPC .................. *B60Q 1/24* (2013.01); *B60R 1/24* (2022.01); *G06V 20/588* (2022.01); *H04N 7/183* (2013.01); *H05B 47/105* (2020.01); *B60R 2300/308* (2013.01)

(58) Field of Classification Search
CPC .......... B60Q 1/24; H05B 47/105; B60R 1/24; B60R 2300/308; G06V 20/588; H04N 7/183
See application file for complete search history.

(56) References Cited

U.S. PATENT DOCUMENTS

| | | | |
|---|---|---|---|
| 9,969,261 | B2 | 5/2018 | Kodama |
| 10,045,173 | B1 | 8/2018 | Morimura et al. |
| 10,106,157 | B2 | 10/2018 | Sawada et al. |
| 10,150,407 | B2 | 12/2018 | Takahashi et al. |

(Continued)

FOREIGN PATENT DOCUMENTS

| | | |
|---|---|---|
| JP | 2014-120113 A | 6/2014 |
| JP | 2019015793 A | 4/2019 |

(Continued)

*Primary Examiner* — Henry Luong

(57) ABSTRACT

Provided is a vehicle periphery monitoring system that displays a captured image including a road surface around a vehicle captured by a camera of the vehicle to a user of the vehicle. The system includes a road surface drawing unit configured to draw, with light, an external notification indication having a predetermined shape on the road surface around the vehicle, and a drawing range recognition unit configured to recognize a drawing range of the external notification indication in the captured image and recognizes at least one of a luminance and a color value around the drawing range. The road surface drawing unit is configured to adjust a luminance of the external notification indication to approach the luminance around the drawing range of the captured image, or adjust a color value of the external notification indication to approach the color value of the drawing range of the captured image.

4 Claims, 6 Drawing Sheets

(56)                    References Cited

U.S. PATENT DOCUMENTS

| 10,696,297 | B2 | 6/2020 | Nguyen Van et al. | |
| 11,001,255 | B2 | 5/2021 | Fukuman et al. | |
| 11,110,937 | B2 | 9/2021 | Kinoshita et al. | |
| 2019/0001968 | A1 | 1/2019 | Yorifuji et al. | |
| 2019/0071098 | A1* | 3/2019 | Asakura | G08G 1/167 |
| 2019/0344828 | A1 | 11/2019 | Omori et al. | |
| 2019/0389488 | A1 | 12/2019 | Yamada et al. | |
| 2023/0166652 | A1 | 6/2023 | Mouri et al. | |

FOREIGN PATENT DOCUMENTS

| JP | 7031799 | B | 2/2022 |
| JP | 2023-081413 | A | 6/2023 |

* cited by examiner

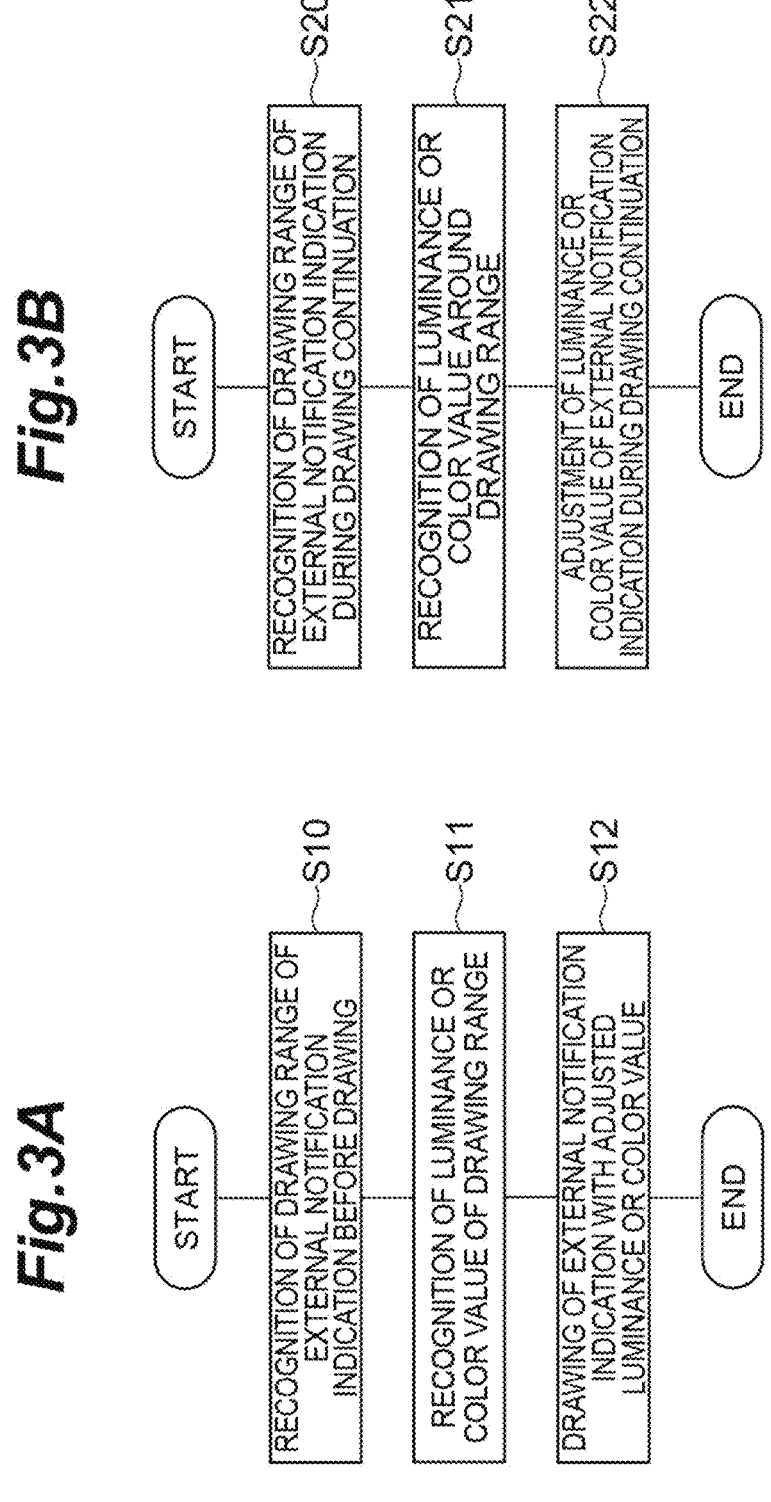

*Fig.3B*

START

RECOGNITION OF DRAWING RANGE OF EXTERNAL NOTIFICATION INDICATION DURING DRAWING CONTINUATION — S20

RECOGNITION OF LUMINANCE OR COLOR VALUE AROUND DRAWING RANGE — S21

ADJUSTMENT OF LUMINANCE OR COLOR VALUE OF EXTERNAL NOTIFICATION INDICATION DURING DRAWING CONTINUATION — S22

END

*Fig.3A*

START

RECOGNITION OF DRAWING RANGE OF EXTERNAL NOTIFICATION INDICATION BEFORE DRAWING — S10

RECOGNITION OF LUMINANCE OR COLOR VALUE OF DRAWING RANGE — S11

DRAWING OF EXTERNAL NOTIFICATION INDICATION WITH ADJUSTED LUMINANCE OR COLOR VALUE — S12

END

VEHICLE PERIPHERY MONITORING SYSTEM

CROSS-REFERENCE TO RELATED APPLICATIONS

This application is based upon and claims the benefit of priority from Japanese Patent Application No. 2023-160046, filed on Sep. 25, 2023, the entire contents of which are incorporated herein by reference.

TECHNICAL FIELD

The present disclosure relates to a vehicle periphery monitoring system.

BACKGROUND

In the related art, Japanese Unexamined Patent Publication No. 2014-120113 is known as a technical document related to a vehicle periphery monitoring system. This publication discloses a road surface drawing device that draws, with light, a notification display having a predetermined shape on a road surface in a traveling direction of a vehicle.

SUMMARY

Incidentally, there is known a vehicle periphery monitoring system that supports monitoring of a periphery of a vehicle of a user by displaying a captured image of a camera outside the vehicle on a display inside the vehicle. However, when the vehicle periphery monitoring system is used in combination with the above-described road surface drawing device, there is a problem that it is difficult for the user to monitor a situation of the road surface due to the indication drawn on the road surface by the road surface drawing device.

One aspect of the present disclosure is a vehicle periphery monitoring system that displays a captured image including a road surface around a vehicle captured by a camera of the vehicle to a user of the vehicle. The vehicle periphery monitoring system includes a road surface drawing unit that draws, with light, an external notification indication having a predetermined shape on the road surface around the vehicle, and a drawing range recognition unit that recognizes a drawing range of the external notification indication in the captured image and recognizes at least one of a luminance and a color value around the drawing range. The road surface drawing unit adjusts a luminance of the external notification indication to approach the luminance around the drawing range of the captured image, or adjusts a color value of the external notification indication to approach the color value of the drawing range of the captured image.

Another aspect of the present disclosure is a vehicle periphery monitoring system that displays a captured image including a road surface around a vehicle captured by a camera of the vehicle to a user of the vehicle. The vehicle periphery monitoring system includes a road surface drawing unit that draws, with light, an external notification indication having a predetermined shape on the road surface around the vehicle, and a drawing range recognition unit that recognizes a drawing range of the external notification indication in the captured image before the drawing of the external notification indication by the road surface drawing unit and recognizes at least one of a luminance and a color value of the drawing range before the drawing of the external notification indication. The road surface drawing unit draws the external notification indications with an adjusted luminance to approach the luminance of the drawing range of the captured image, or draws the external notification indication with an adjusted color value to approach the color value of the drawing range of the captured image.

According to each aspect of the present disclosure, when the user of the vehicle monitors the periphery of the vehicle through the captured image of the camera outside the vehicle, it is possible to suppress the difficulty for the user in monitoring the situation of the road surface due to the display drawn on the road surface.

BRIEF DESCRIPTION OF THE DRAWINGS

FIG. 3A is a flowchart illustrating an example of pre-drawing processing of the external notification indication;

FIG. 3B is a flowchart illustrating an example of drawing adjustment processing of the external notification indication;

DETAILED DESCRIPTION

Hereinafter, embodiments of the present disclosure will be described with reference to the drawings.

First Embodiment

Figure 1:
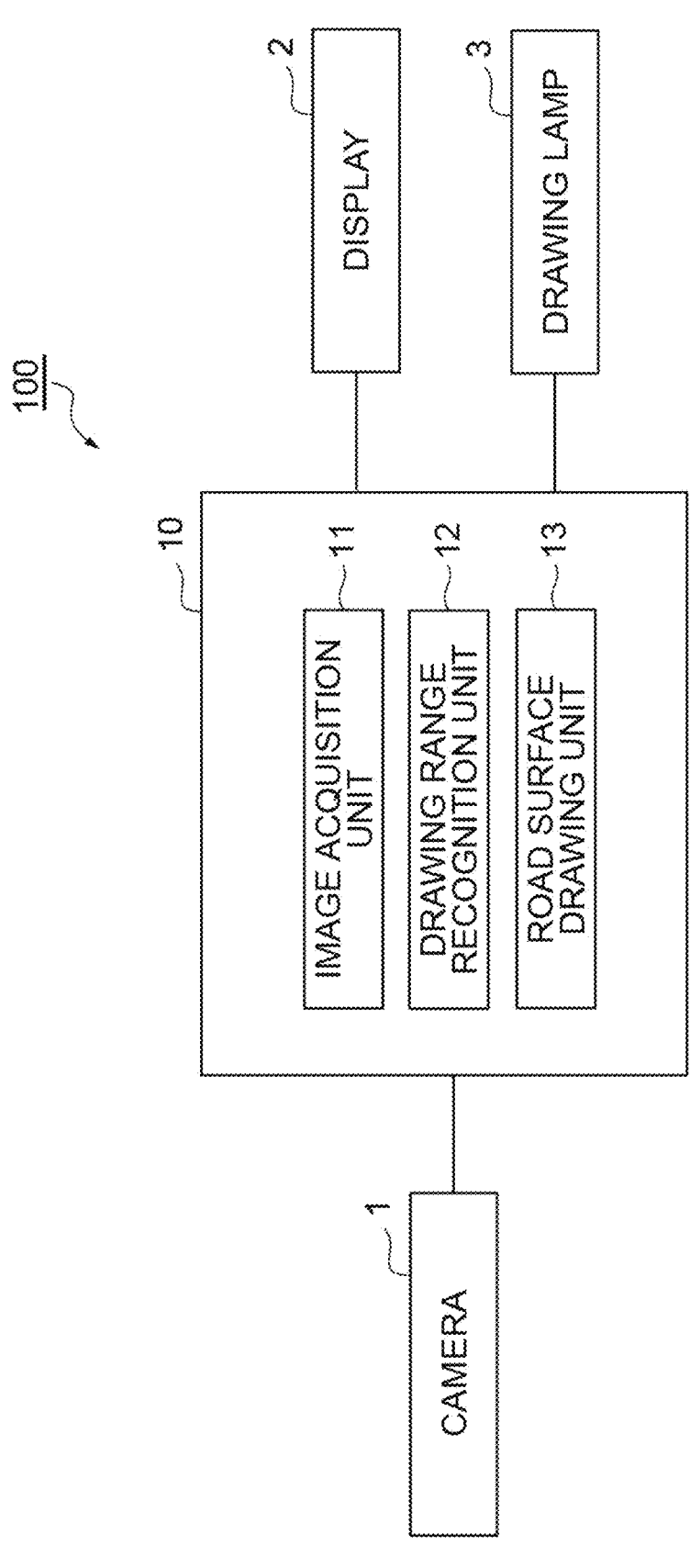
FIG. 1 is a block diagram illustrating a vehicle periphery monitoring system according to a first embodiment.

FIG. 1 is a block diagram illustrating a vehicle periphery monitoring system 100 according to a first embodiment. The vehicle periphery monitoring system 100 is an in-vehicle system that allows a user of a vehicle to monitor the situation around the vehicle by displaying a captured image from a camera 1 that captures the outside of the vehicle on a display 2 inside the vehicle. The user may be a driver of the vehicle or an occupant of a self-driving vehicle. The occupant may include a person sitting on a passenger seat, or may include a person sitting on a rear seat.

In addition, the vehicle periphery monitoring system 100 draws, with light, external notification indications on a road surface around the vehicle. The external notification indications are, for example, indications for notifying pedestrians or other vehicles around the vehicle of the vehicle's behavior in advance.

Figure 2B:
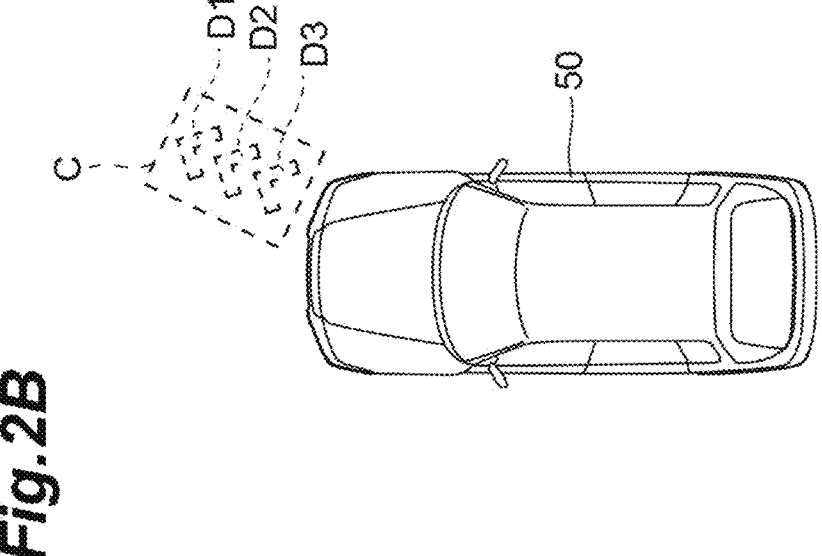
FIG. 2B is a plan view for describing a drawing range and a drawing range surrounding area.
Figure 2A:
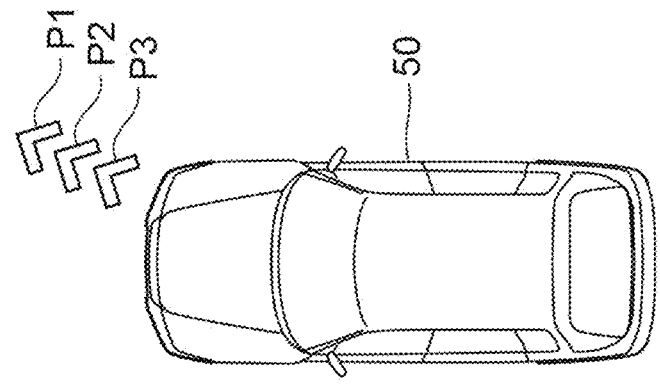
FIG. 2A is a plan view for describing an example of an external notification indication.

Here, FIG. 2A is a plan view for describing an example of the external notification indications. In FIG. 2A, external notification indications P1 to P3 are drawn on a road surface in front of a vehicle 50. The external notification indications P1 to P3 illustrated in FIG. 2A are, for example, L-shaped indications drawn when a directional indicator on a right side of the vehicle 50 is turned on. As a result, pedestrians and other vehicles around the vehicle 50 can grasp that the vehicle 50 is scheduled to turn right.

Note that, the external notification indications P1 to P3 may be drawn on the road surface to extend in a direction corresponding to a steering angle when the parked vehicle 50 starts moving, regardless of whether the directional indicator is on or off. The shapes of the external notification indications P1 to P3 are not limited to the L-shape. The external notification indications P1 to P3 may have a triangular shape, a square shape, or an arch shape. The external notification indications P1 to P3 are not necessarily divided into a plurality of indications, and may be represented as one arrow shape.

The shapes and arrangement of the external notification indications are not limited to an aspect illustrated in FIG. 2A. The external notification indication may include a backward notification indication drawn on a road surface behind the vehicle 50 to notify the pedestrians and other vehicles around the vehicle 50 that the vehicle is scheduled to move backward or is moving backward. In addition, the external notification indication may include an indication indicating a traveling direction of the vehicle 50 at a low speed or a scheduled lane change.

In addition, the other vehicle to be notified of the external notification indication is not limited to a manual-driving vehicle driven by a human driver, and may include a self-driving vehicle. In this case, the self-driving vehicle recognizes a next behavior of the vehicle 50 by recognizing the external notification indication drawn on the road surface in the captured image of the camera.

Next, a structure of the vehicle periphery monitoring system 100 according to the first embodiment will be described. As illustrated in FIG. 1, the vehicle periphery monitoring system 100 includes an electronic control unit [ECU] 10 that integrally manages the system.

The ECU 10 is an electronic control unit including a central processing unit [CPU] and a storage unit. The storage unit includes a read only memory [ROM], a random access memory [RAM], an electrically erasable programmable read-only memory [EEPROM], and the like. In the ECU 10, for example, various functions are realized by the CPU executing a program stored in the storage. The ECU 10 may include a plurality of electronic units. The ECU 10 is connected to the camera 1, the display 2, and a drawing lamp 3.

The camera 1 is a capturing device that captures a situation of an outside of the vehicle 50. The camera 1 includes, for example, a front camera provided on a back side of a windshield of the vehicle 50, a rear camera provided on a back side of a rear window of the vehicle 50, and the like. A capturing range of the camera 1 includes a road surface around the vehicle 50. An installation place and the number of cameras 1 are not limited. The camera 1 transmits a captured image around the vehicle 50 to the ECU 10.

The display 2 is a display device that is provided in the interior of the vehicle 50 and provides image information to the user, such as a driver. The display 2 is provided, for example, on a dashboard between a driver seat and a passenger seat. The display 2 may be incorporated behind a steering wheel of the driver seat or in a part of an instrument panel. One display 2 is not necessarily provided, and a plurality of displays 2 may be provided.

The drawing lamp 3 is a signal lamp that is provided outside the vehicle 50 and draws the external notification indications on the road surface. The drawing lamp 3 can be provided, for example, in the vicinity of turn signal lamps provided on the left and right on a front side and the left and right on a rear side of the vehicle 50. The drawing lamp 3 may be provided only on the front side of the vehicle 50 or only on the rear side of the vehicle 50. The drawing lamp 3 may also be used as another lighting device.

A light source of the drawing lamp 3 is not particularly limited, and a light emitting diode [LED], a light source laser beam, a halogen valve, a high-intensity discharge [HID] lamp, or the like can be adopted. The drawing lamp 3 is controlled by a control signal from the ECU 10. Details of the drawing lamp 3 and a drawing method of the external notification indications can refer to Japanese Unexamined Patent Publication No. 2023-81413.

Next, a functional configuration of the ECU 10 will be described. The ECU 10 includes an image acquisition unit 11, a drawing range recognition unit 12, and a road surface drawing unit 13.

The image acquisition unit 11 acquires the captured image of the camera 1 and displays the captured image of the camera 1 on the display 2. The image acquisition unit 11 may combine captured images of a plurality of cameras and may display the combined image on the display 2. The image acquisition unit 11 may constitute a part of the vehicle periphery monitoring system such as a panoramic view monitor.

The drawing range recognition unit 12 recognizes a drawing range of the external notification indications in the captured image of the camera 1. The drawing range is a range in which the external notification indications are drawn. Here, FIG. 2B is a plan view for describing a drawing range and a drawing range surrounding area. The drawing range and the drawing range surrounding area are included in the capturing range of the camera 1. The drawing range recognition unit 12 recognizes the drawing range when a drawing start condition for the external notification indication to be described later is satisfied. The drawing range recognition unit 12 recognizes the drawing range based on, for example, table data in which a type of the external notification indications and the drawing range are associated in advance.

In FIG. 2B, drawing ranges D1 to D3 and a drawing range surrounding area C are illustrated. The drawing ranges D1 to D3 are areas corresponding to the external notification indications P1 to P3 in FIG. 2A. The drawing range surrounding area C is an area around the drawing ranges D1 to D3 set to surround the drawing ranges D1 to D3. The drawing range surrounding area is set as an area where the external notification indications P1 to P3 which are being drawn in the drawing ranges D1 to D3 do not protrude.

Note that, the drawing range D1 does not necessarily need to coincide with the external notification indication P1, and may be set as an area including the external notification indication P1. The same applies to the drawing ranges D2 and D3. The drawing range surrounding area C does not necessarily have to be a rectangular area, and may be an area that is near the drawing range and surrounds the drawing range. The drawing range surrounding area C may be set as an area within a certain distance from the drawing range. The drawing range surrounding area C may be set in each of the drawing ranges D1 to D3.

Note that, although FIG. 2B illustrates the drawing ranges D1 to D3 viewed from above the vehicle 50, the drawing range recognition unit 12 recognizes the drawing ranges D1 to D3 in the captured image of the camera 1. In the following description, the drawing ranges D1 to D3 and the drawing range surrounding area C mean ranges on the captured image.

In addition, the drawing range recognition unit 12 recognizes the drawing range surrounding area C in the captured image of the camera 1. Further, the drawing range recognition unit 12 recognizes luminances and color values of the drawing ranges D1 to D3 and a luminance and a color value of the drawing range surrounding area C from the captured image of the camera 1. The luminance is a degree of brightness in the pixel of the captured image. The color value is a parameter of color in the pixel of the captured image. The color value can be, for example, RGB values (Red, Green, Blue). The color value may be expressed as a parameter of an HSL (Hue: hue, Saturation: saturation, Lightness: lightness). The color value may be expressed as a parameter of a YUV (luminance signal, difference between luminance signal and blue component, difference between luminance signal and red component).

The road surface drawing unit 13 controls the drawing lamp 3 to draw the external notification indications on the road surface. The road surface drawing unit 13 draws the external notification indications P1 to P3 illustrated in FIG. 2A on the road surface in front of the vehicle 50, for example, when the directional indicator is turned on as the drawing start condition for the external notification indication.

When a gear stick of the vehicle 50 is switched to a reverse gear or when the backward movement of the vehicle 50 is started by self-driving, the road surface drawing unit 13 may draw backward movement notification indications (external notification indications) on the road surface behind the vehicle 50. In addition, a well-known condition disclosed in Japanese Unexamined Patent Publication No. 2023-81413 or the like can be adopted as the drawing start condition for the external notification indication.

Next, processing at the start of drawing the external notification indications in the road surface drawing unit 13 will be described. The road surface drawing unit 13 draws, on the road surface, the external notification indications P1 to P3 with the adjusted luminances to approach the luminances of the drawing ranges D1 to D3 recognized before drawing at the start of drawing the external notification indications. The luminance of the drawing range D1 can be, for example, an average value of the luminances of pixels included in the drawing range D1. A minimum value or a maximum value may be used instead of the average value. An average value of luminances of pixels (pixels on an outermost peripheral side) constituting a peripheral edge of the drawing range D1 may be used. The same applies to the drawing ranges D2 and D3.

Specifically, the road surface drawing unit 13 adjusts the luminance of the external notification indication P1 to approach the luminance of the drawing range D1 as compared with an initial setting luminance. The road surface drawing unit 13 may or may not coincide with the luminance of the drawing range D1 with the luminance of the external notification indication P1. The road surface drawing unit 13 may divide the drawing range D1 into a plurality of blocks and may adjust the luminance of the region corresponding to each block of the external notification indication P1 to approach an average value of the luminances of the blocks. The number of blocks is not particularly limited.

In addition, the road surface drawing unit 13 may not perform the luminance adjustment when a difference between the initial setting luminance of the external notification indication P1 and the luminance of the drawing range D1 is less than a certain value. The same applies to the external notification indications P2 and P3.

The road surface drawing unit 13 draws, on the road surface, the external notification indications P1 to P3 with the adjusted color values based on the color values of the drawing ranges D1 to D3 recognized before the drawing of the external notification indications. The road surface drawing unit 13 draws, on the road surface, the external notification indications P1 to P3 with the adjusted color values to approach the color values of the drawing ranges D1 to D3 before the drawing. The color value of the drawing range D1 can be, for example, an average value of color values of pixels included in the drawing range D1. An average value of color values of pixels forming the peripheral edge of the drawing range D1 (pixels on the outermost peripheral side) may be used. The same applies to the drawing ranges D2 and D3.

Specifically, the road surface drawing unit 13 adjusts the color value of the external notification indication P1 to approach the color value of the drawing range D1 as compared with an initial setting color value. The road surface drawing unit 13 may or may not coincide with the color value of the drawing range D1 with the color value of the external notification indication P1. The road surface drawing unit 13 may divide the drawing range D1 into a plurality of blocks, and may adjust a color value of a region corresponding to each block of the external notification indication P1 to approach an average value of color values of the blocks. The number of blocks is not particularly limited.

In addition, the road surface drawing unit 13 may not perform the color value adjustment when a difference between the initial setting color value of the external notification indication P1 and the color value of the drawing range D1 is less than a certain value. The difference between the color values can be, for example, a largest value among differences between parameters of the RGB values. The same applies to the external notification indications P2 and P3.

Next, processing during the continuation of the drawing of the external notification indications in the road surface drawing unit 13 will be described. During the continuation of the drawing of the external notification indications, the road surface drawing unit 13 adjusts the external notification indications by using the luminance and color value of the drawing range surrounding area C instead of the drawing ranges D1 to D3 in which the external notification indications P1 to P3 are drawn.

The luminance of the drawing range surrounding area C can be, for example, an average value of the luminances of the pixels included in the drawing range surrounding area C. A minimum value or a maximum value may be used instead of the average value. An average value of luminances of pixels (pixels adjacent to the drawing ranges D1 to D3) constituting an inner periphery of the drawing range surrounding area C may be used.

The road surface drawing unit 13 adjusts the luminance of the external notification indication P1 to approach the luminance of the drawing range surrounding area C as compared with a current luminance of the external notification indication P1, for example. The road surface drawing unit 13 may or may not coincide with the luminance of the drawing range surrounding area C with the luminance of the external notification indication P1. The road surface drawing unit 13 may not perform the luminance adjustment when a difference between the current luminance of the external notification indication P1 and the luminance of the drawing range surrounding area C is less than a certain value. The same applies to the external notification indications P2 and P3.

In addition, the road surface drawing unit 13 may divide the drawing range surrounding area C into a plurality of blocks surrounding the drawing ranges D1 to D3, and may adjust the luminances of the external notification indications P1 to P3 to approach the average value of the luminances of the blocks. While the drawing is continued, the road surface drawing unit 13 repeats the adjustment of the luminances and color values of the external notification indications at regular intervals.

Note that, the road surface drawing unit 13 may adjust only one of the luminance and the color value before the drawing or during the continuation of the drawing. In this case, the drawing range recognition unit 12 may recognize only one of the luminance and the color value. The road surface drawing unit 13 may adjust both the luminances and the color value of the external notification indications before the drawing, and may adjust only the luminances of the external notification indications during the continuation of the drawing.

Next, processing of the vehicle periphery monitoring system 100 according to the first embodiment will be described. FIG. 3A is a flowchart illustrating an example of pre-drawing processing of the external notification indication. The pre-drawing processing of the external notification indications is executed, for example, when the drawing start condition for the external notification indication is satisfied.

As illustrated in FIG. 3A, the ECU 10 of the vehicle periphery monitoring system 100 causes the drawing range recognition unit 12 to recognize the drawing ranges D1 to D3 of the external notification indications before drawing in S10. The drawing range recognition unit 12 recognizes the drawing ranges D1 to D3 in the captured image based on, for example, table data in which the type of the external notification indications and the drawing ranges D1 to D3 are associated in advance. Thereafter, the ECU 10 proceeds to S11.

In step S11, the ECU 10 causes the drawing range recognition unit 12 to recognize the luminances or color values of the drawing ranges D1 to D3. The drawing range recognition unit 12 recognizes the luminances and the color value of the drawing ranges D1 to D3 from the captured image of the camera 1. Thereafter, the ECU 10 proceeds to S12.

In S12, the ECU 10 causes the road surface drawing unit 13 to draw the external notification indications. The road surface drawing unit 13 draws, on the road surface, the external notification indications P1 to P3 with the adjusted luminances to approach the luminances of the drawing ranges D1 to D3 recognized before drawing. Alternatively, the road surface drawing unit 13 draws, on the road surface, the external notification indications P1 to P3 with the adjusted color values to approach the color values of the drawing ranges D1 to D3 recognized before drawing. The road surface drawing unit 13 may adjust both the luminance and the color value. Thereafter, the ECU 10 ends the pre-drawing processing.

Next, the drawing adjustment processing of the external notification indications will be described. FIG. 3B is a flowchart illustrating an example of drawing adjustment processing of the external notification indication. The drawing adjustment processing of the external notification indications is executed during the continuation of the drawing of the external notification indications.

As illustrated in FIG. 3B, the ECU 10 causes the drawing range recognition unit 12 to recognize the drawing range surrounding area C in S20. The drawing range recognition unit 12 recognizes the drawing range surrounding area C in the captured image based on, for example, table data in which the type of the external notification indications and the drawing range surrounding area C are associated in advance.

In S21, the ECU 10 causes the drawing range recognition unit 12 to recognize the luminances and the color values of the drawing range surrounding area C. The drawing range recognition unit 12 recognizes the luminance or the color value of the drawing range surrounding area C from the captured image of the camera 1.

In S22, the ECU 10 adjusts the luminances and the color values of the external notification indications by the road surface drawing unit 13. The road surface drawing unit 13 adjusts the luminance of the external notification indication P1 to approach the luminance of the drawing range surrounding area C as compared with a current luminance of the external notification indication P1, for example. The road surface drawing unit 13 may adjust both the luminance and the color value. The ECU 10 repeats the processing from S20 at regular intervals while the drawing is continued.

According to the vehicle periphery monitoring system 100 according to the first embodiment described above, when the user of the vehicle 50 monitors the periphery of the vehicle through the display 2 on which the captured image of the camera 1 appears, since the luminance or the color value of the drawing range in the captured image is recognized before drawing and the external notification indications with at least one of the adjusted luminance and the color value to approach the luminance or the color value of the drawing range in the captured image is drawn on the road surface, it is possible to suppress the difficulty of the user monitoring the situation of the road surface by the external notification indications drawn on the road surface.

In addition, in the vehicle periphery monitoring system 100, since the luminance or the color value of the drawing range surrounding area in the captured image is recognized during the continuation of the external notification indications and at least one of the luminance and the color value of the external notification indication is adjusted to approach the luminance or the color value of the drawing range surrounding area in the captured image, it is possible to suppress the difficulty of the user monitoring the situation of the road surface by the external notification indications drawn on the road surface.

Second Embodiment

Figure 4:
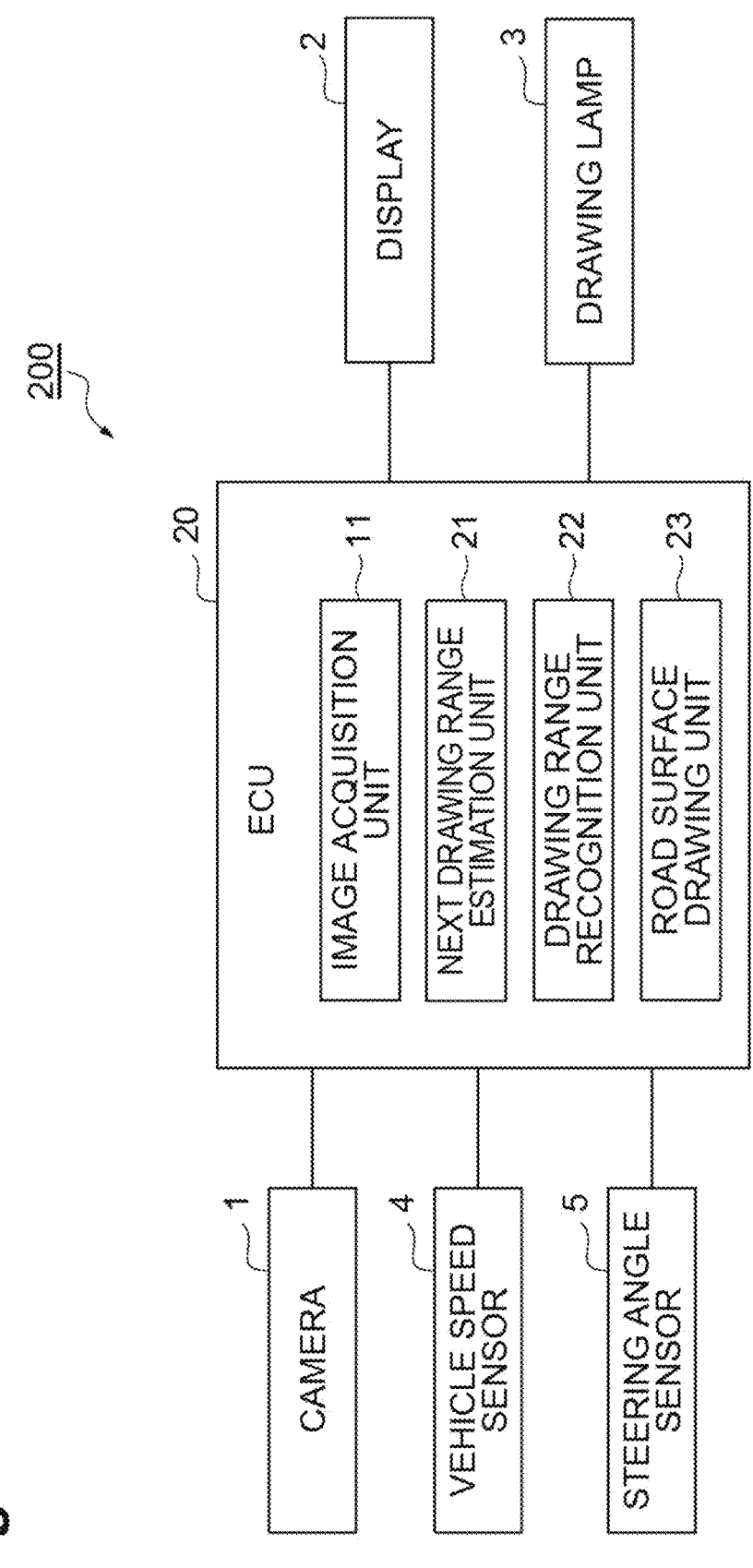
FIG. 4 is a block diagram illustrating a vehicle periphery monitoring system according to a second embodiment.

Next, a vehicle periphery monitoring system according to a second embodiment will be described with reference to the drawings. The same or corresponding components as the components of the first embodiment are denoted by the same reference signs, and redundant description will be omitted. FIG. 4 is a block diagram illustrating a vehicle periphery monitoring system 200 according to the second embodiment. The vehicle periphery monitoring system 200 according to the second embodiment is different from the first embodiment in that at least one of the luminance and the color value of the external notification indication is adjusted in consideration of a change in drawing position of the external notification indication due to movement of a vehicle 50.

Specifically, an ECU 20 of the vehicle periphery monitoring system 200 is connected to a vehicle speed sensor 4 and a steering angle sensor 5. The vehicle speed sensor 4 is a sensor that detects a vehicle speed of the vehicle 50. The vehicle speed sensor 4 transmits information on the detected vehicle speed to the ECU 20. The steering angle sensor 5 is a sensor that detects a steering angle of the vehicle 50. The steering angle sensor 5 transmits information on the detected steering angle to the ECU 20.

The ECU 20 of the second embodiment is different from the ECU 10 of the first embodiment in that it has a drawing range recognition unit 22 and a road surface drawing unit 23 with additional functions and a next drawing range estimation unit 21 newly added.

When the vehicle 50 satisfying a drawing start condition for external notification indications is moving, the next drawing range estimation unit 21 estimates a next drawing range to be a drawing range of next external notification indications by the movement of the vehicle 50. First, the next drawing range estimation unit 21 recognizes the movement of the vehicle 50 based on the information on the vehicle speed detected by the vehicle speed sensor 4 and the information on the steering angle detected by the steering angle sensor 5. The movement of the vehicle 50 includes a traveling direction and a vehicle speed.

The next drawing range estimation unit 21 estimates the next drawing range from the movement of the vehicle 50 and the captured image (image of a road surface) of the camera 1. The term "next" means a next drawing timing of the external notification indications repeatedly drawn by a drawing lamp 3. The next drawing timing may be 30 milliseconds, 40 milliseconds, or 20 milliseconds after a previous drawing timing. The next drawing timing is not particularly limited.

The next drawing range estimation unit 21 may estimate the next drawing range by using, for example, table data in which the movement of the vehicle 50, a type of the external notification indications, and the next drawing range are associated in advance. Note that, the image captured by the camera 1 according to the second embodiment may be limited to an image on which the traveling direction of the vehicle 50 is captured.

Figure 5:
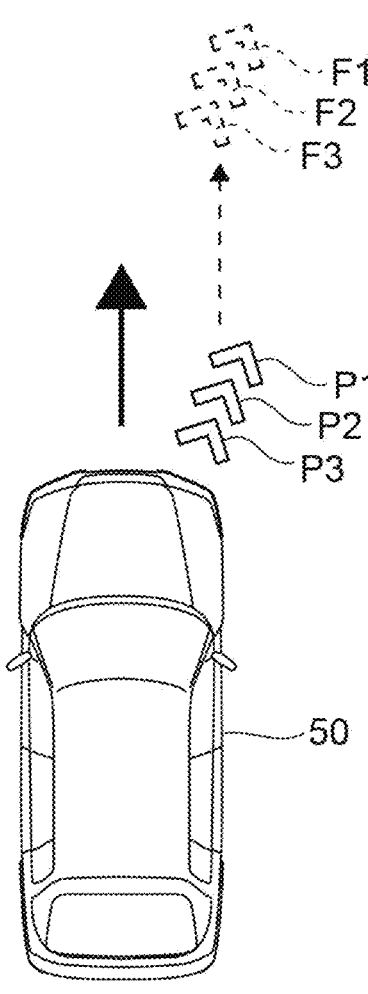
FIG. 5 is a plan view for describing a next drawing range.

Here, FIG. 5 is a plan view for describing the next drawing range. FIG. 5 illustrates next drawing ranges F1 to F3 of external notification indications P1 to P3. In addition, the movement of the vehicle 50 until the next drawing timing is indicated by an arrow. As illustrated in FIG. 5, the next drawing range estimation unit 21 estimates the next drawing ranges F1 to F3 of the external notification indications P1 to P3 from the movement of the vehicle 50 and the captured image of the camera 1.

The drawing range recognition unit 22 recognizes luminances or color values of the next drawing ranges F1 to F3 estimated by the next drawing range estimation unit 21. The drawing range recognition unit 22 recognizes the luminances or color values before the external notification indications P1 to P3 are drawn in the next drawing ranges F1 to F3. The drawing range recognition unit 22 recognizes the luminances or color values of the next drawing ranges F1 to F3 from the captured image of the camera 1. The same definition as the above-described luminances of the drawing ranges can be used for the luminances of the next drawing ranges F1 to F3. The same applies to the color values.

When the external notification indications P1 to P3 are drawn in the next drawing ranges F1 to F3, the road surface drawing unit 23 draws the external notification indications P1 to P3 with the adjusted luminances to approach the luminances of the next drawing ranges F1 to F3. In addition, when the external notification indications P1 to P3 are drawn in the next drawing ranges F1 to F3, the road surface drawing unit 23 draws the external notification indications P1 to P3 with the adjusted color values to approach the color values of the next drawing ranges F1 to F3. The adjustment of the luminances and the color values can be performed in the same manner as in the first embodiment.

Figure 6:
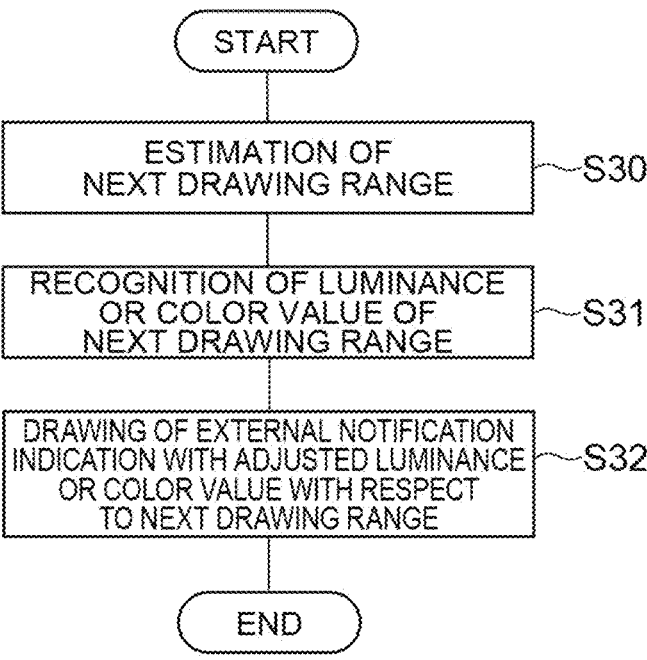
FIG. 6 is a flowchart illustrating an example of drawing processing for the next drawing range.

Next, processing of the vehicle periphery monitoring system 200 according to the second embodiment will be described with reference to FIG. 6. FIG. 6 is a flowchart illustrating an example of drawing processing for the next drawing range.

As illustrated in FIG. 6, the ECU 20 of the vehicle periphery monitoring system 200 estimates the next drawing ranges F1 to F3 by the next drawing range estimation unit 21 in S30. The next drawing range estimation unit 21 estimates the next drawing ranges F1 to F3 from the movement of the vehicle 50 and the captured image of the camera 1. Thereafter, the ECU 20 proceeds to S31.

In step S31, the ECU 20 causes the drawing range recognition unit 22 to recognize the luminances or color values of the next drawing ranges F1 to F3. The drawing range recognition unit 22 recognizes the luminances or color values of the next drawing ranges F1 to F3 from the captured image of the camera 1. Thereafter, the ECU 20 proceeds to S32.

In S32, the ECU 20 draws the external notification indications P1 to P3 with the adjusted luminances or color values by the road surface drawing unit 23 in the next drawing ranges F1 to F3. The road surface drawing unit 23 draws the external notification indications P1 to P3 with the adjusted luminances to approach the luminances of the next drawing ranges F1 to F3. Alternatively, the road surface drawing unit 23 draws the external notification indications P1 to P3 with the adjusted color values to approach the color values of the next drawing ranges F1 to F3. The road surface drawing unit 23 may adjust both the luminances and the color values.

According to the vehicle periphery monitoring system 200 according to the second embodiment described above, since the next drawing ranges F1 to F3 are estimated, the external notification indications P1 to P3 are adjusted to approach the luminances or color values of the next drawing ranges F1 to F3, and drawing is performed, it is possible to suppress the difficulty of the user monitoring the situation of the road surface by the external notification indications P1 to P3 drawn on the road surface.

Although the embodiments of the present disclosure have been described above, the present disclosure is not limited to the embodiments. The present disclosure can be implemented in various forms with various modifications and improvements based on knowledge of those skilled in the art, including the embodiments.

The vehicle periphery monitoring systems 100 and 200 do not need to be capable of executing both the processing at the start of drawing the external notification indications and the processing during the continuation of drawing of the external notification indications, and may be capable of executing only one of these kinds of processing.

What is claimed is:

1. A vehicle periphery monitoring system that displays a captured image including a road surface around a vehicle captured by a camera of the vehicle to a user of the vehicle, the system comprising:

a road surface drawing unit configured to draw an external notification indication having a predetermined shape with light on the road surface around the vehicle; and a drawing range recognition unit configured to recognize a drawing range of the external notification indication in the captured image and to recognize at least one of a luminance and a color value around the drawing range, wherein the road surface drawing unit is configured to adjust a luminance of the external notification indication to approach the luminance around the drawing range of the captured image, or adjust a color value of the external notification indication to approach the color value of the drawing range of the captured image.

2. A vehicle periphery monitoring system that displays a captured image including a road surface around a vehicle captured by a camera of the vehicle to a user of the vehicle, the system comprising:

a road surface drawing unit configured to draw, with light, an external notification indication having a predetermined shape on the road surface around the vehicle; and a drawing range recognition unit configured to recognize a drawing range of the external notification indication in the captured image before the drawing of the external notification indication by the road surface drawing unit, and to recognize at least one of a luminance and a color value of the drawing range before the drawing of the external notification indication, wherein the road surface drawing unit is configured to draw the external notification indication with an adjusted luminance to approach the luminance of the drawing range of the captured image, or draw the external notification indication with an adjusted color value to approach the color value of the drawing range of the captured image.

3. The vehicle periphery monitoring system according to claim 1, further comprising:

a next drawing range estimation unit configured to estimate a next drawing range to be a drawing range of a next external notification indication by movement of the vehicle, wherein the drawing range recognition unit is configured to recognize at least one of a luminance and a color value of the next drawing range in the captured image before the external notification indication is drawn in the next drawing range, and the road surface drawing unit is configured to draw the external notification indication with an adjusted luminance to approach the luminance of the next drawing range when the external notification indication is drawn in the next drawing range, or to draw the external notification indication with an adjusted color value to approach the color value of the next drawing range when the external notification indication is drawn in the next drawing range.

4. The vehicle periphery monitoring system according to claim 2, further comprising:

a next drawing range estimation unit configured to estimate a next drawing range to be a drawing range of a next external notification indication by movement of the vehicle, wherein the drawing range recognition unit is configured to recognize at least one of a luminance and a color value of the next drawing range in the captured image before the external notification indication is drawn in the next drawing range, and the road surface drawing unit is configured to draw the external notification indication with an adjusted luminance to approach the luminance of the next drawing range when the external notification indication is drawn in the next drawing range, or to draw the external notification indication with an adjusted color value to approach the color value of the next drawing range when the external notification indication is drawn in the next drawing range.

* * * * *